United States Patent
Lin et al.

(10) Patent No.: US 11,605,210 B2
(45) Date of Patent: Mar. 14, 2023

(54) METHOD FOR OPTICAL CHARACTER RECOGNITION IN DOCUMENT SUBJECT TO SHADOWS, AND DEVICE EMPLOYING METHOD

(71) Applicant: Mobile Drive Technology Co., Ltd., New Taipei (TW)

(72) Inventors: Yun-Hsuan Lin, New Taipei (TW); Yung-Yu Chuang, New Taipei (TW); Tzu-Kuei Huang, New Taipei (TW); Ting-Hao Chung, New Taipei (TW); Nai-Sheng Syu, New Taipei (TW); Yu-Ching Wang, New Taipei (TW); Chun-Hsiang Huang, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 296 days.

(21) Appl. No.: 17/154,958

(22) Filed: Jan. 21, 2021

(65) Prior Publication Data

US 2021/0224565 A1     Jul. 22, 2021

(30) Foreign Application Priority Data

Jan. 21, 2020   (CN) .......................... 202010070590.0

(51) Int. Cl.
*G06V 10/22*   (2022.01)
*G06N 3/08*    (2006.01)
(Continued)

(52) U.S. Cl.
CPC ......... *G06V 10/225* (2022.01); *G06K 9/6256* (2013.01); *G06N 3/08* (2013.01); *G06V 30/153* (2022.01)

(58) Field of Classification Search
CPC .............. G06V 10/225; G06V 30/153; G06V 30/19147; G06V 30/19173; G06V 30/10;
(Continued)

(56) References Cited

U.S. PATENT DOCUMENTS 4,984,285 A * 1/1991 Kano .................. G06V 10/147
                                                358/461
5,099,341 A * 3/1992 Nosaki .................. H04N 1/401
                                                358/461
(Continued)

FOREIGN PATENT DOCUMENTS

CN    106778721    5/2017
CN    109214322    1/2019
(Continued)

*Primary Examiner* — Lewis G West
(74) *Attorney, Agent, or Firm* — ScienBiziP, P.C.

(57) ABSTRACT

A method for recognition of characters by optical means in an unclear or non-optimal image of an object document, the image carrying shadows or other impediments inputs the document into a shadow prediction model to obtain a shadow mask. A determination is made as to whether the shadow mask of the document affect an optical character recognition (OCR) performance. The method further inputs the document into a shadow removing model for removal of shadows to obtain an intermediate document if the shadow mask are deemed to affect the OCR performance, then OCR can then be performed on the final object document.

17 Claims, 2 Drawing Sheets

US 11,605,210 B2

Page 2

(51) Int. Cl.
*G06K 9/62* (2022.01)
*G06V 30/148* (2022.01)

(58) Field of Classification Search
CPC ........ G06V 30/40; G06K 9/6256; G06N 3/08; G06N 3/0454; G06N 3/0445; G06N 3/084; G06T 7/507
See application file for complete search history.

(56) References Cited

U.S. PATENT DOCUMENTS

| | | | | |
|---|---|---|---|---|
| 5,257,074 A | * | 10/1993 | Kamei | G03G 15/04018 358/1.11 |
| 5,271,067 A | * | 12/1993 | Abe | G06V 10/98 382/311 |
| 5,621,202 A | * | 4/1997 | Aoki | G06K 7/14 348/364 |
| 2002/0103776 A1 | * | 8/2002 | Bella | G06K 9/6217 706/45 |
| 2002/0130953 A1 | * | 9/2002 | Riconda | G02B 19/0009 382/104 |
| 2008/0175507 A1 | * | 7/2008 | Lookingbill | G06V 30/142 382/255 |
| 2011/0110595 A1 | * | 5/2011 | Kim | G06V 30/1431 382/190 |
| 2013/0060786 A1 | * | 3/2013 | Serrano | G06V 30/19173 707/E17.03 |
| 2017/0289405 A1 | * | 10/2017 | Agrawal | H04N 1/6005 |
| 2017/0309003 A1 | * | 10/2017 | Bako | G06V 10/60 |
| 2018/0012101 A1 | * | 1/2018 | Mizes | G06V 10/273 |
| 2019/0266706 A1 | * | 8/2019 | Mondal | G06V 10/26 |
| 2019/0311227 A1 | * | 10/2019 | Kriegman | G06V 30/19173 |
| 2022/0203604 A1 | * | 6/2022 | Cambridge | B29C 33/3842 |
| 2022/0398399 A1 | * | 12/2022 | Muffat | G06N 3/0454 |
| 2022/0404509 A1 | * | 12/2022 | Faragher | G01S 19/22 |

FOREIGN PATENT DOCUMENTS

| | | |
|---|---|---|
| CN | 109685100 | 4/2019 |
| CN | 110674815 | 1/2020 |
| TW | 201447773 | 12/2014 |

* cited by examiner

METHOD FOR OPTICAL CHARACTER RECOGNITION IN DOCUMENT SUBJECT TO SHADOWS, AND DEVICE EMPLOYING METHOD

FIELD

The subject matter herein generally relates to the optical character recognition (OCR) in document processing.

BACKGROUND

OCR refers to a process of recognizing optical characters through image processing technology and pattern recognition technology, and translating the optical characters into computer characters. However, shadows may appear on a document when using an electronic device (for example a mobile phone) to capture photos of the document, making recognition of characters by optical means problematic.

Thus, there is room for improvement.

BRIEF DESCRIPTION OF THE DRAWINGS

Implementations of the present disclosure will now be described, by way of embodiments, with reference to the attached figures.

DETAILED DESCRIPTION

Figure 1:
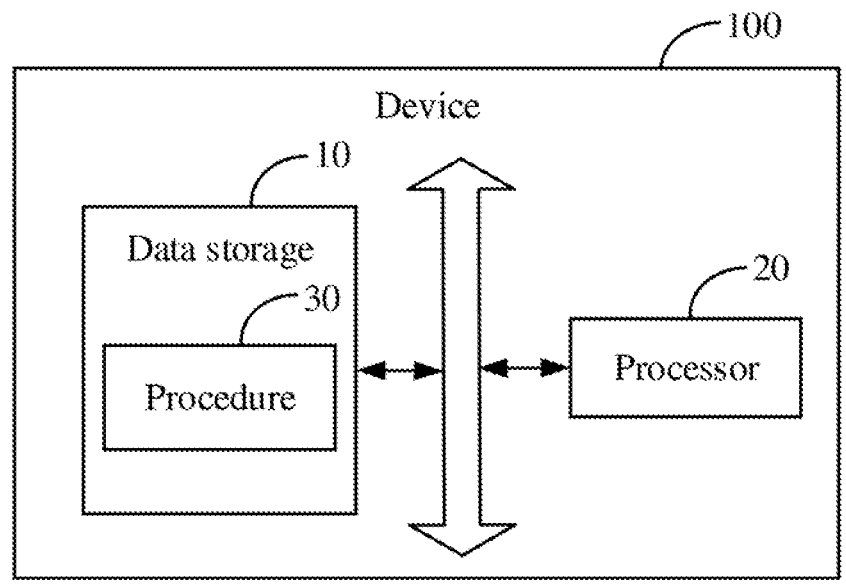
FIG. 1 is a block diagram of an embodiment of a device for optically recognizing characters of a document.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a device (device 100) for recognizing characters of a document, in one embodiment. The device 100 can comprise at least one data storage 10, at least one processor 20, and a procedure for recognizing the characters of the document (procedure 30). The procedure 30 may comprise a plurality of computerized codes, the plurality of computerized codes may include commands that can be executed by the processor 20.

In one embodiment, the device 100 can be a mobile phone, a tablet personal computer, or etc. The device 100 can further comprise a camera, a display device, a network access device, and communication buses. The camera can be configured to capture images of a document or part.

In one embodiment, the data storage 10 can be in the device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the device 100.

Figure 2:
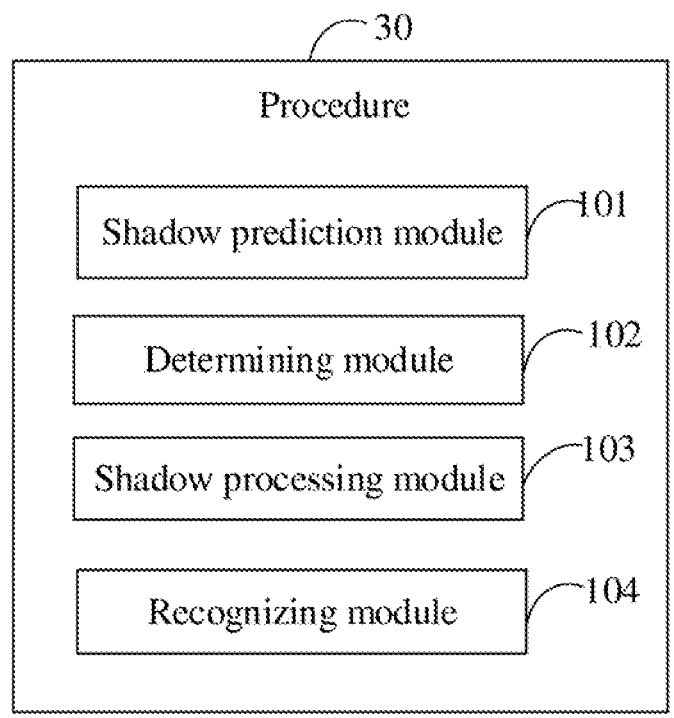
FIG. 2 is a block diagram of an embodiment of a procedure for recognizing characters of the document applied in the device of FIG. 1.

FIG. 2 illustrates the procedure 30 as comprising a plurality of modules, such as a shadow prediction module 101, a determining module 102, a shadow processing module 103, and a recognizing module 104. The modules 101-104 may comprise one or more software programs in the form of computerized codes stored in the data storage 10. The computerized codes may include commands that can be executed by the processor 20 to provide functions for the modules 101-104.

The shadow prediction module 101 inputs images of a document (object document) into a shadow prediction model to obtain a shadow mask which appear on the object document. The shadow mask can comprise a shadow region and a shadow intensity.

In one embodiment, the object document can be a document that requires the recognition of characters. Many images of the object document can be obtained by an image capturing method.

In one embodiment, the shadow prediction model can be trained based on sample documents of a sample library. For example, the shadow prediction model can be obtained by training a predetermined deep learning network based on the sample documents of the sample library. The shadow prediction model can be trained through a supervised learning architecture. The predetermined deep learning network can be selected according to an actual application, for example, the predetermined deep learning network can be a convolutional neural network (CNN) architecture, a recurrent neural network (RNN) architecture, or a back propagation (BP) network architecture, etc. The sample library can be established in a predetermined manner before model training. For example, the sample documents can be manually collected or a collection built up, and stored in a specified storage area to establish the sample library. The sample documents in the sample library can comprise a plurality of first sample documents that have shaded regions or shadows and a plurality of second sample documents that are free of shading and shadows. The sample library can be stored in the data storage 10, or in other storage devices not belonging to the device 100.

In one embodiment, training features of each of the sample documents can comprise a background color and a shadow mask. The shadow prediction model can be configured to extract the background color and the shadow mask of a document. Shadows can be added to the plurality of first sample documents by a predetermined shadow adding software to facilitate the extraction of training features. For example, a modeler can use the predetermined shadow adding software to add shadows into a plurality of documents to obtain the plurality of first sample documents. The predetermined shadow-adding software can be selected according to the actual application.

In one embodiment, the predetermined deep learning network can comprise an input layer, multiple hidden layers, and an output layer. A method of training the shadow prediction model can be as follows. The sample documents of the sample library are randomly divided into a training set and a test set. An amount of data of the training set is greater than an amount of data of the test set. For example, there may be eighty percent of the sample documents in the training set, and twenty percent of the sample documents in the test set. The predetermined deep learning network can be trained through the training set to obtain a first intermediate model, and the first intermediate model can be tested through the test set. The number of tests of the first intermediate model can be counted based on a result of testing each sample document in the test set. The passes and failures in the testing of the first intermediate model can determine whether the first intermediate model meets a predetermined standard. If the first intermediate model meets the predetermined standard, training of the predetermined deep learning network can be stopped and the first intermediate model can be defined as the shadow prediction model. If the first intermediate model fails in testing, that is, does not meet the predetermined standard, training parameters of the predetermined deep learning network are adjusted, and the predetermined deep learning network with the adjusted training parameters can be retrained through the training set to obtain a second intermediate model. The second intermediate model can be tested through the test set. If the second intermediate model still fails during testing and does not meet the predetermined standard, adjustment steps of model parameters can be repeated until a retrained intermediate model meets the predetermined standard by passing the tests.

For example, each group of data (one sample document being a group) for testing in the test set is inputted to the first intermediate model to extract a background color and a shadow mask. If an extraction rate of the extractable data meets a requirement, the result is defined as a pass, if the extraction rate does not meet the requirement, the result is defined as failure.

In one embodiment, the training parameters of the predetermined deep learning network can comprise a total number of layers, and a number of neurons in each layer. The adjusting of training parameters can comprise: adjusting the total number of layers of the predetermined deep learning network and/or a number of neurons in each layer of the predetermined deep learning network.

When the testing of the first intermediate model is a pass, the model is regarded as meeting the predetermined standard. The first intermediate model can be defined as the shadow prediction model. When the testing of the first intermediate produces a failure, the model does not meet the predetermined standard. The training parameters of the predetermined deep learning network can be adjusted and the adjusted predetermined deep learning network can be retrained through the training set to obtain a second intermediate model. The second intermediate model can be tested through the test set. When the testing of the second intermediate model meets the predetermined standard, the second intermediate model is deemed to pass. The second intermediate model can be defined as the shadow prediction model. If the testing of the second intermediate model still results in failing, adjustment steps of model parameters can be repeated to perform until a result of testing of the retrained intermediate model is a pass.

In one embodiment, the predetermined standard may be defined according to the actual application, for example, the predetermined standard can be ninety-five percent. When a precision rate of shadow extraction of the first intermediate model is greater than the predetermined threshold, then the first intermediate model is deemed to meet the requirements of the model.

In one embodiment, when the shadow prediction model is trained, the shadow prediction module 101 can input the object document into the shadow prediction model, and the shadow prediction model can output the shadow mask of the object document. Then the shadow prediction module 101 can obtain the shadow mask of the object document.

The determining module 102 determines whether the shadow mask of the object document affect an OCR performance in relation to the object document.

In one embodiment, when the shadow prediction module 101 obtains the shadow mask of the object document, the determining module 102 can compare the shadow mask of the object document with corresponding reference thresholds, to determine whether the shadow mask of the object document affect the OCR performance of the object document.

For example, a first reference threshold is defined with respect to the shadow region, and a second reference threshold is defined with respect to the shadow intensity. When the shadow region of the object document is greater than the first reference threshold and the shadow intensity of the object document is greater than the second reference threshold, the determining module 102 determines that the shadow mask of the object document do affect the OCR performance of the object document. The first reference threshold and the second reference threshold can be defined according to an actual character recognition requirement.

The shadow processing module 103 inputs the object document into a shadow removing model for removing shadows. Where the shadow mask of the object document do affect the OCR performance of the object document, the object document processed with shadow removal is regarded as an intermediate document.

In one embodiment, when the determining module 102 determines that the shadow mask of the object document affect the OCR performance of the object document, the shadow processing module 103 can input the object document into the shadow removing model to remove shadows from the object document.

In one embodiment, a method of training the shadow removing model can be as follows. The shadow prediction model extracts the background color and the shadow mask of each sample document of the sample library. The background color and the shadow mask of each sample document extracted by the shadow prediction model are inputted to the predetermined shadow removing network for training, to obtain a first intermediate removing model. Shadows from multiple test documents of a predetermined test set are removed through the first intermediate removing model, and then an average recognition rate of each of the multiple test documents is counted. A determination is made as to whether the average recognition rate is greater than or less than a predetermined recognition rate. If greater, such average recognition rate of the first intermediate removing model is defined as the shadow removing model.

In one embodiment, the shadow prediction model can only extract the background color and the shadow mask of the plurality of first sample documents with shadows. The predetermined shadow removing network can be a current network with a shadow removing function established by a deep learning architecture. Training processes of the first intermediate removing model can be set according to an actual requirement. For example, the training processes of the first intermediate removing model can refer to the training processes of the shadow prediction model. When the first intermediate removing model is trained, the first intermediate removing model can perform removal of shadows based on the background color and the shadow mask of the document, or can be based on the shadow mask of the document.

In one embodiment, the multiple test documents of the predetermined test set can be documents with shadows. The multiple test documents can be selected from the sample library. The multiple test documents can be specific documents with shadows that are added by the predetermined shadow adding software. When the first intermediate removing model is trained, the first intermediate removing model can perform shadow removal on the multiple test documents, and the average recognition rate can be calculated in relation to the multiple test documents.

In one embodiment, when shadows of each of the multiple test documents are removed, an OCR performance of each of the multiple test documents can be counted, and the average recognition rate of the multiple test documents can be calculated according to the OCR performance of each of the multiple test documents.

In one embodiment, the predetermined recognition rate may be defined according to the actual application, for example, the predetermined recognition rate can be ninety-eight percent. When the average recognition rate is greater than the predetermined recognition rate, then the first intermediate removing model is deemed to meet the requirements of the model, and the first intermediate removing model can be defined as the shadow removing model.

In one embodiment, when the average recognition rate is not greater than the predetermined recognition rate, the first intermediate removing model is deemed to fail. The training parameters of the predetermined shadow removing network can then be adjusted. The background color and the shadow mask of each of the sample documents extracted by the shadow prediction model are inputted into the predetermined shadow removing network with the adjusted training parameters for training, to obtain a second intermediate removing model. The second intermediate removing model can be tested through the multiple test documents of the predetermined test set. Shadows of the multiple test documents of the predetermined test set are removed through the second intermediate removing model, and an average recognition rate of the multiple test documents is recalculated. If the average recognition rate is greater than the predetermined recognition rate, the second intermediate removing model is deemed to pass, and the second intermediate removing model can be defined as the shadow removing model. If the average recognition rate still results in failing, adjustment steps of model parameters can be repeated to perform until an average recognition rate of the retrained intermediate model is a pass.

In one embodiment, the shadow prediction model can extract the background color and the shadow mask of the object document, and the shadow removing model can remove shadows from the object document based on the background color and the shadow mask of the object document. In other embodiments, the shadow removing model may also perform shadow removal on the object document based on the shadow mask of the object document.

The recognizing module 104 performs OCR on the intermediate document.

In one embodiment, when the shadows of the object document are removed to obtain the intermediate document, the recognizing module 104 can perform the OCR on the intermediate document. The OCR performance of the object document can be improved.

In one embodiment, when the determining module 102 determines that the shadow mask of the object document do not affect the OCR performance of the object document, the object document is deemed to be not affected by shadows, and the recognizing module 104 can directly perform OCR on the object document.

Figure 3:
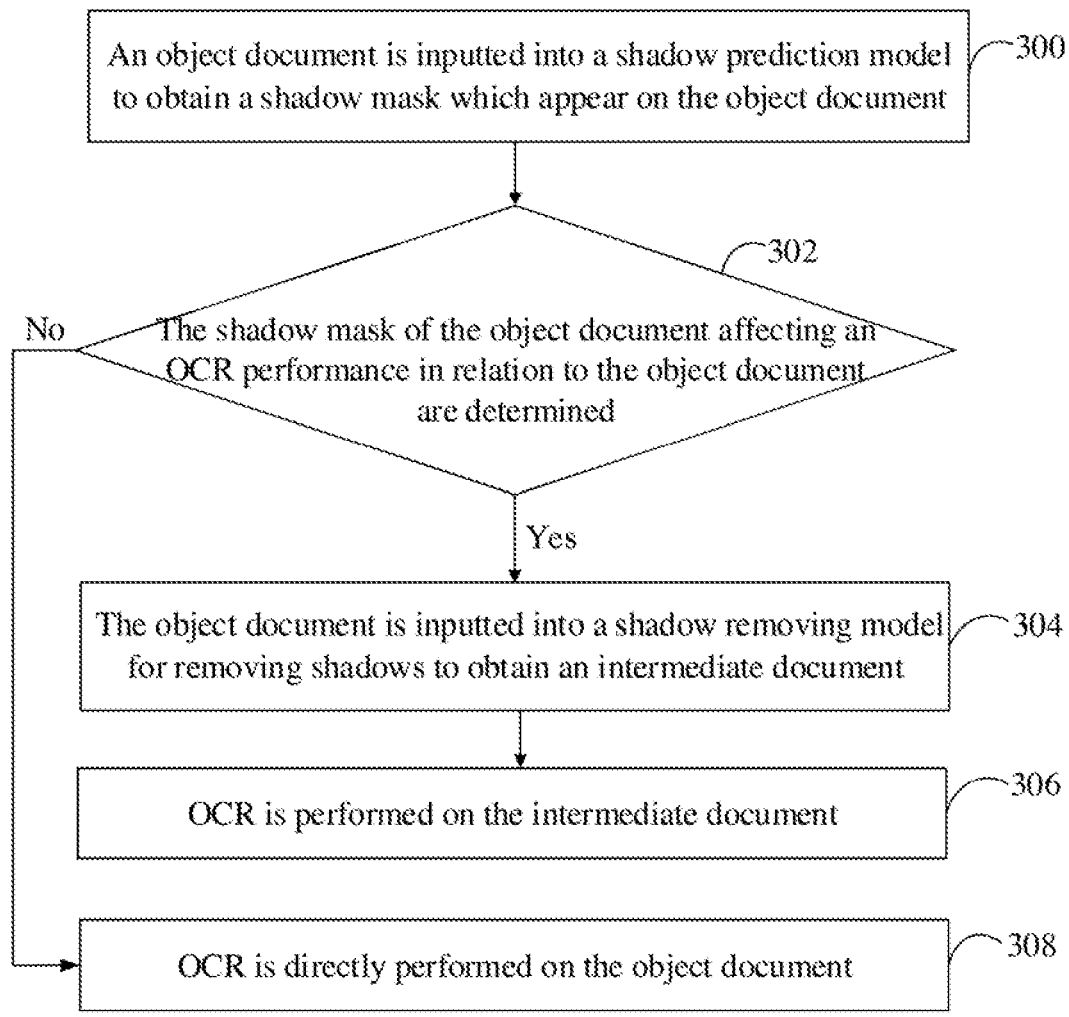
FIG. 3 is a flow diagram of an embodiment of a method for recognizing characters in a document.

FIG. 3 illustrates one exemplary embodiment of a method for recognizing characters of a document by optical means. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 3 may represent one or more processes, methods, or sub-routines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, an object document is inputted into a shadow prediction model to obtain a shadow mask which appear on the object document.

In one embodiment, the shadow mask can comprise a shadow region and a shadow intensity, the object document can be a document that requires the recognition of characters. Many images of the object document can be obtained by an image capturing method.

In one embodiment, the shadow prediction model can be trained based on sample documents of a sample library. For example, the shadow prediction model can be obtained by training a predetermined deep learning network based on the sample documents of the sample library. The shadow prediction model can be trained through a supervised learning architecture. The predetermined deep learning network can be selected according to an actual application, for example, the predetermined deep learning network can be a CNN architecture, an RNN architecture, or a BP network architecture, etc. The sample library can be established in a predetermined manner before model training. For example, the sample documents can be manually collected or built up as a collection and stored in a specified storage area to establish the sample library. The sample documents in the sample library can comprise a plurality of first sample documents that have shaded regions or shadows and a plurality of second sample documents that are free of shading and shadows. The sample library can be stored in the data storage 10, or in other storage devices not belonging to the device 100.

In one embodiment, training features of each of the sample documents can comprise a background color and a shadow mask. The shadow prediction model can be configured to extract the background color and the shadow mask of a document. Shadows can be added to the plurality of first sample documents by a predetermined shadow adding software to facilitate the extraction of training features. For example, a modeler can use the predetermined shadow adding software to add shadows into a plurality of documents to obtain the plurality of first sample documents. The predetermined shadow adding software can be selected according to the actual application.

In one embodiment, the predetermined deep learning network can comprise an input layer, multiple hidden layers, and an output layer. A method of training the shadow prediction model can be as follows. The sample documents of the sample library are randomly divided into a training set and a test set. An amount of data of the training set is greater than an amount of data of the test set. For example, there may be eighty percent of the sample documents in the training set, and twenty percent of the sample documents in the test set. The predetermined deep learning network can be trained through the training set to obtain a first intermediate model, and the first intermediate model can be tested through the test set. The number of tests of the first intermediate model can be counted based on a result of the testing of each sample document in the test set. The passes and failures in the testing of the first intermediate model can determine whether the first intermediate model meets a predetermined standard. If the first intermediate model meets the predetermined standard, training of the predetermined deep learning network can be stopped and the first intermediate model can be defined as the shadow prediction model. If the first intermediate model does not meet the predetermined standard, training parameters of the predetermined deep learning network are adjusted, and the predetermined deep learning network with the adjusted training parameters can be retrained through the training set to obtain a second intermediate model. The second intermediate model can be tested through the test set. If the second intermediate model still during testing and does not meet the predetermined standard according to testing, adjustment steps of model parameters can be repeated until the retrained intermediate model meets the predetermined standard by passing the tests.

For example, each group of data (one sample document being a group) for testing in the test set is inputted to the first intermediate model to extract a background color and a shadow mask. If an extraction rate of the extractable data meets a requirement, the result is defined as a pass, if the extraction rate does not meet the requirement, the result is defined as failure.

In one embodiment, the training parameters of the predetermined deep learning network can comprise a total number of layers, and a number of neurons in each layer. The adjusting of training parameters can comprise: adjusting the total number of layers of the predetermined deep learning network and/or a number of neurons in each layer of the predetermined deep learning network.

When the testing of the first intermediate model is a pass, the model is regarded as meeting the predetermined standard. The first intermediate model can be defined as the shadow prediction model. When the testing of the first intermediate produces a failure, the model does not meet the predetermined standard. The training parameters of the predetermined deep learning network can be adjusted and the adjusted predetermined deep learning network can be retrained through the training set to obtain a second intermediate model. The second intermediate model can be tested through the test set. When the testing of the second intermediate model meets the predetermined standard, the second intermediate model is deemed to pass. The second intermediate model can be defined as the shadow prediction model. If the second intermediate model still results in failing the testing, adjustment steps of model parameters can be repeated to perform until the retrained intermediate model is a pass.

In one embodiment, the predetermined standard may be defined according to the actual application, for example, the predetermined standard can be ninety-five percent. When a shadow extraction rate of the first intermediate model is greater than the predetermined threshold, then the first intermediate model is deemed to meet the requirements of the model.

In one embodiment, when the shadow prediction model is trained, the object document can be inputted into the shadow prediction model, the shadow prediction model can output the shadow mask of the object document.

In block 302, the shadow mask of the object document affecting an OCR performance in relation to the object document are determined.

In one embodiment, when the shadow mask of the object document are obtained, the shadow mask of the object document can be compared with reference thresholds, to determine whether the shadow mask of the object document affect the OCR performance.

For example, a first reference threshold is defined with respect to the shadow region, and a second reference threshold is defined with respect to the shadow intensity. When the shadow region of the object document is greater than the first reference threshold and the shadow intensity of the object document is greater than the second reference threshold, OCR is deemed to be affected by the shadow mask of the object document. The first reference threshold and the second reference threshold can be defined according to an actual character recognition requirement.

In block 304, if the shadow mask of the object document are deemed to affect the OCR performance of the object document, the object document is inputted into a shadow removing model for removing shadows to obtain an intermediate document.

In one embodiment, when the shadow mask of the object document are determined to affect the OCR performance of the object document, the object document can be inputted into the shadow removing model to remove shadows of the object document.

In one embodiment, a method of training the shadow removing model is as follows. The shadow prediction model extracts the background color and the shadow mask of each sample document of the sample library. The background color and the shadow mask of each sample document extracted by the shadow prediction model are inputted to the predetermined shadow removing network for training to obtain a first intermediate removing model. The shadows of multiple test documents of a predetermined test set are removed through the first intermediate removing model, and an average recognition rate is calculated over all the multiple test documents. The average recognition rate can be calculated as being greater or less than a predetermined recognition rate. If the average recognition rate is found to be greater than the predetermined recognition rate, the first intermediate removing model is defined as the shadow removing model.

In one embodiment, the shadow prediction model can only extract the background color and the shadow mask of the plurality of first sample documents with shadows. The predetermined shadow removing network can be a current network with a shadow removing function established by a deep learning architecture. Training processes of the first intermediate removing model can be set according to an actual requirement. For example, the training processes of the first intermediate removing model can refer to the training processes of the shadow prediction model. When the first intermediate removing model is trained, the first intermediate removing model can perform removal of shadows based on the background color and the shadow mask of the document, or can be based on the shadow mask of the document.

In one embodiment, the multiple test documents of the predetermined test set can be documents with shadows. The multiple test documents can be selected from the sample library. The multiple test documents can be specific documents with shadows that are added by the predetermined shadow adding software. When the first intermediate removing model is trained, the first intermediate removing model can perform shadow removal on the multiple test documents, and the average recognition rate can be calculated in relation to the multiple test documents.

In one embodiment, when shadows of each of the multiple test documents are removed, an OCR performance of each of the multiple test documents can be counted, and the average recognition rate of the multiple test documents can be calculated.

In one embodiment, the predetermined recognition rate may be defined according to the actual application, for example, the predetermined recognition rate can be ninety-eight percent. When the average recognition rate is greater than the predetermined recognition rate, then the first intermediate removing model is deemed to meet the requirements, and the first intermediate removing model can be defined as the shadow removing model.

In one embodiment, when the average recognition rate is nor greater than the predetermined recognition rate, the first intermediate removing model is deemed to fail. The training parameters of the predetermined shadow removing network can be adjusted. The background color and the shadow mask of each of the sample documents extracted by the shadow prediction model are inputted into the predetermined shadow removing network with the adjusted training parameters for training to obtain a second intermediate removing model. The second intermediate removing model can be tested through the multiple test documents of the predetermined test set. The shadows in the multiple test documents of the predetermined test set are removed through the second intermediate removing model, and then an average recognition rate is recalculated. If the average recognition rate is greater than the predetermined recognition rate, the second intermediate removing model is deemed to pass, and the second intermediate removing model can be defined as the shadow removing model. If the average recognition rate still results in failing, adjustment steps of model parameters can be repeated to perform until a repeatedly retrained intermediate model is a pass.

In one embodiment, the shadow prediction model can extract the background color and the shadow mask of the object document, and the shadow removing model can remove the shadows of the object document based on the background color and the shadow mask of the object document. In other embodiments, the shadow removing model may also perform shadow removal on the object document based on the shadow mask of the object document.

In block 306, OCR is performed on the intermediate document.

In one embodiment, when the shadows of the object document are removed to obtain the intermediate document, the OCR can be performed on the intermediate document. The OCR performance of the object document can be improved.

In block 308, if the shadow mask of the object document are deemed to not affect the OCR performance of the object document, OCR is directly performed on the object document.

In one embodiment, when the shadow mask of the object document are deemed to not affect the OCR performance of the object document, OCR can be directly performed on the object document without shadow removal.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A character recognizing method operated in an electronic device, comprising:
    inputting an object document into a shadow prediction model to obtain a shadow mask of the object document, wherein the shadow mask comprises a shadow region and a shadow intensity;
    determining whether the shadow mask of the object document affect an optical character recognition (OCR) performance of the object document;
    inputting the object document into a shadow removing model for removing shadows to obtain an intermediate document when the shadow mask of the object document affect the OCR performance of the object document;
    performing OCR on the intermediate document; and
    performing OCR on the object document when the shadow mask of the object document do not affect the OCR performance of the object document.

2. The character recognizing method of claim 1, wherein the shadow prediction model is trained based on sample documents of a sample library.

3. The character recognizing method of claim 2, wherein the sample library comprises a plurality of first sample documents with shadows and a plurality of second sample documents without shadows, the shadows of the plurality of first sample documents are added by a predetermined shadow adding software.

4. The character recognizing method of claim 2, wherein training the shadow prediction model comprises:
    training a predetermined deep learning network based on the sample documents of the sample library to obtain the shadow prediction model;
    wherein training features of each of the sample documents comprises a background color of each of the sample documents and a shadow mask of each of the sample documents.

5. The character recognizing method of claim 4, wherein training the predetermined deep learning network based on the sample documents of the sample library to obtain the shadow prediction model comprises:
    dividing the sample documents of the sample library into a training set and a test set;

training the predetermined deep learning network through the training set to obtain a first intermediate model, and testing the first intermediate model through the test set; and defining the first intermediate model as the shadow prediction model if a testing of the first intermediate model meets a predetermined standard.

6. The character recognizing method of claim 5, wherein training the predetermined deep learning network based on the sample documents of the sample library to obtain the shadow prediction model further comprises:

adjusting training parameters of the predetermined deep learning network if the testing of the intermediate model does not meet the predetermined standard;

retraining the predetermined deep learning network with the adjusted training parameters through the training set to obtain a second intermediate model and testing the second intermediate model through the test set;

defining the second intermediate model as the shadow prediction model if a testing of the second intermediate model meets the predetermined standard; and repeating the adjusting step of the training parameters and the retraining step if the testing of the second intermediate model does not meet the predetermined standard.

7. The character recognizing method of claim 4, wherein training the shadow removing model comprises:

inputting the background color, the shadow mask of each of the sample documents obtained by the shadow prediction model into a predetermined shadow removing network for training to obtain a first intermediate removing model;

removing shadows of multiple test documents of a predetermined test set through the first intermediate removing model, and calculating an average recognition rate of the multiple test documents when the OCR is performed on each of multiple removed test documents, wherein the multiple test documents of the predetermined test set are documents with shadows;

determining whether the average recognition rate is greater than a predetermined recognition rate; and defining the first intermediate removing model as the shadow removing model if the average recognition rate is greater than the predetermined recognition rate.

8. The character recognizing method of claim 7, wherein training the shadow removing model further comprising:

adjusting training parameters of the predetermined shadow removing network if the average recognition rate is not greater than the predetermined recognition rate;

inputting the background color, the shadow mask of each of the sample documents obtained by the shadow prediction model into the predetermined shadow removing network with the adjusted training parameters for training to obtain a second intermediate removing model; and testing the second intermediate removing model based on the multiple test documents of the predetermined test set.

9. A character recognizing device comprising:

at least one processor; and a data storage storing one or more programs which when executed by the at least one processor, cause the at least one processor to:

input an object document into a shadow prediction model to obtain a shadow mask, wherein the shadow mask comprises a shadow region and a shadow intensity;

determine whether the shadow mask of the object document affect an optical character recognition (OCR) performance of the object document;

input the object document into a shadow removing model for removing shadows to obtain an intermediate document when the shadow mask of the object document affect the OCR performance of the object document;

perform OCR on the intermediate document; and perform OCR on the object document when the shadow mask of the object document do not affect the OCR performance of the object document.

10. The character recognizing device of claim 9, wherein the shadow prediction model is trained based on sample documents of a sample library.

11. The character recognizing device of claim 10, wherein the sample library comprises a plurality of first sample documents with shadows and a plurality of second sample documents without shadows, the shadows of the plurality of first sample documents are added by a predetermined shadow adding software.

12. The character recognizing device of claim 10, wherein training the shadow prediction model comprises:

training a predetermined deep learning network based on the sample documents of the sample library to obtain the shadow prediction model;

wherein training features of each of the sample documents comprises a background color of each of the sample documents and a shadow mask of each of the sample documents.

13. The character recognizing device of claim 12, wherein training the predetermined deep learning network based on the sample documents of the sample library to obtain the shadow prediction model comprises:

dividing the sample documents of the sample library into a training set and a test set;

training the predetermined deep learning network through the training set to obtain a first intermediate model, and testing the first intermediate model through the test set; and defining the first intermediate model as the shadow prediction model if a testing of the first intermediate model meets a predetermined standard.

14. The character recognizing device of claim 13, wherein training the predetermined deep learning network based on the sample documents of the sample library to obtain the shadow prediction model further comprises:

adjusting training parameters of the predetermined deep learning network if the testing of the intermediate model does not meet the predetermined standard;

retraining the predetermined deep learning network with the adjusted training parameters through the training set to obtain a second intermediate model and testing the second intermediate model through the test set;

defining the second intermediate model as the shadow prediction model if a testing of the second intermediate model meets the predetermined standard; and repeating the adjusting step of the training parameters and the retraining step if the testing of the second intermediate model does not meet the predetermined standard.

15. The character recognizing device of claim 12, wherein training the shadow removing model comprises:

inputting the background color and the shadow mask of each of the sample documents obtained by the shadow prediction model into a predetermined shadow removing network for training to obtain a first intermediate removing model;

removing shadows of multiple test documents of a predetermined test set through the first intermediate removing model, and calculating an average recognition rate of the multiple test documents when the OCR is performed on each of multiple removed test documents, wherein the multiple test documents of the predetermined test set are documents with shadows;

determining whether the average recognition rate is greater than a predetermined recognition rate; and defining the first intermediate removing model as the shadow removing model if the average recognition rate is greater than the predetermined recognition rate.

16. The character recognizing device of claim 15, wherein training the shadow removing model further comprises:

adjusting training parameters of the predetermined shadow removing network if the average recognition rate is not greater than the predetermined recognition rate;

inputting the background color and the shadow mask of each of the sample documents obtained by the shadow prediction model into the predetermined shadow removing network with the adjusted training parameters for training to obtain a second intermediate removing model; and testing the second intermediate removing model based on the multiple test documents of the predetermined test set.

17. A non-transitory storage medium having stored thereon instructions that, when executed by a processor of an electronic device, causes the electronic device to perform a character recognizing method, the character recognizing method comprising:

inputting an object document into a shadow prediction model to obtain a shadow mask of the object document, wherein the shadow mask comprises a shadow region and a shadow intensity;

determining whether the shadow mask of the object document affect an optical character recognition (OCR) performance of the object document;

inputting the object document into a shadow removing model for removing shadows to obtain an intermediate document when the shadow mask of the object document affect the OCR performance of the object document;

performing OCR on the intermediate document; and performing OCR on the object document when the shadow mask of the object document do not affect the OCR performance of the object document.

* * * * *